US011057811B2

(12) United States Patent
Lu et al.

(10) Patent No.: US 11,057,811 B2
(45) Date of Patent: Jul. 6, 2021

(54) BEARER SELECTION FOR DUAL CONNECTIVITY CELLULAR SYSTEMS

(71) Applicant: T-Mobile USA, Inc., Bellevue, WA (US)

(72) Inventors: Kun Lu, Bellevue, WA (US); Ming Shan Kwok, Seattle, WA (US); Salvador Mendoza, Issaquah, WA (US); Alan Denis MacDonald, Bellevue, WA (US); Jun Liu, Issaquah, WA (US); Egil Gronstad, Encinitas, CA (US); Karunakalage Viraj Rakitha Silva, Renton, WA (US); Suresh Thanneeru, Redmond, WA (US)

(73) Assignee: T-Mobile USA, Inc., Bellevue, WA (US)

(*) Notice: Subject to any disclaimer, the term of this patent is extended or adjusted under 35 U.S.C. 154(b) by 46 days.

(21) Appl. No.: 16/221,314

(22) Filed: Dec. 14, 2018

(65) Prior Publication Data
US 2020/0196211 A1 Jun. 18, 2020

(51) Int. Cl.
*H04W 36/14* (2009.01)
*H04W 36/18* (2009.01)
(Continued)

(52) U.S. Cl.
CPC ....... *H04W 36/14* (2013.01); *H04W 36/0027* (2013.01); *H04W 36/18* (2013.01);
(Continued)

(58) Field of Classification Search
CPC ..... H04W 36/14; H04W 36/18; H04W 36/30; H04W 76/15; H04W 36/0027;
(Continued)

(56) References Cited

U.S. PATENT DOCUMENTS 9,819,469 B2    11/2017  Horn et al.
2015/0365878 A1*  12/2015  Cho ................. H04W 40/12
                                         370/254
(Continued)

FOREIGN PATENT DOCUMENTS

WO    WO-2020032648 A1 *  2/2020  ........ H04W 72/1284
WO    WO-2020038391 A1 *  2/2020  ............ H04W 24/04

OTHER PUBLICATIONS

Zhao et al., "Data transmission method and terminal device", Feb. 27, 2020, WIPO, WO 2020038391 (Year: 2020).*
(Continued)

*Primary Examiner* — Ricky Q Ngo
*Assistant Examiner* — Michael K Phillips
(74) *Attorney, Agent, or Firm* — Lee & Hayes, P.C.

(57) ABSTRACT

When using Dual Connectivity in a Non-Standalone Architecture cellular communication system, a data bearer may be steered through a Long-Term Evolution (LTE) base station or a New Radio (NR) base station. Each bearer is assigned a combination of Quality of Service (QoS) values corresponding to the service type that the bearer is supporting. For example, each different service type may be assigned a combination of a QoS Class Identifier and an Allocation and Retention Priority parameter value. Each combination is also associated with a radio access technology such as LTE radio access technology or NR radio access technology. When NR communications are available between a network core and a communication device, and if the bearer's combination of QoS values has been associated with NR, bearer data is routed through an NR base station. Otherwise, the bearer data is routed through the LTE base station.

20 Claims, 3 Drawing Sheets

(51) Int. Cl.
*H04W 36/30* (2009.01)
*H04W 76/15* (2018.01)
*H04W 36/00* (2009.01)
*H04W 72/08* (2009.01)
*H04W 72/10* (2009.01)

(52) U.S. Cl.
CPC ........... *H04W 36/30* (2013.01); *H04W 76/15* (2018.02); *H04W 72/085* (2013.01); *H04W 72/10* (2013.01)

(58) Field of Classification Search
CPC ............... H04W 72/085; H04W 72/10; H04W 28/0268; H04W 28/0278; H04W 48/18; H04W 76/16; H04W 88/06; H04W 36/0069; H04W 28/08; H04W 72/0406; H04W 76/10; H04L 1/1835; H04L 43/08; H04L 43/16; H04L 45/302; H04L 5/006
See application file for complete search history.

(56) References Cited

U.S. PATENT DOCUMENTS

| | | | |
|---|---|---|---|
| 2017/0055313 A1 | 2/2017 | Sharma et al. | |
| 2017/0142611 A1 | 5/2017 | Andgart et al. | |
| 2018/0062819 A1* | 3/2018 | Horn | H04W 28/24 |
| 2018/0213463 A1 | 7/2018 | Cheng et al. | |
| 2018/0367288 A1* | 12/2018 | Vrzic | H04W 36/0069 |
| 2019/0174353 A1* | 6/2019 | Yilmaz | H04W 28/0278 |
| 2019/0191348 A1* | 6/2019 | Futaki | H04W 36/0033 |
| 2019/0342932 A1* | 11/2019 | Futaki | H04W 76/15 |
| 2019/0364464 A1* | 11/2019 | Shaikh | H04L 12/1407 |
| 2019/0394820 A1* | 12/2019 | Patil | H04W 48/20 |
| 2020/0045581 A1* | 2/2020 | Dong | H04W 28/065 |
| 2020/0163144 A1* | 5/2020 | Ryoo | H04W 76/16 |
| 2020/0169909 A1* | 5/2020 | Loehr | H04W 72/10 |
| 2020/0205213 A1* | 6/2020 | Marco | H04W 76/15 |

OTHER PUBLICATIONS

Nokia, et. al., "Corrections to Dual Connectivity with NR feature", S2-1811472, 3GPP TSG-SA WG2 Meeting #129, Oct. 2018, Section 4.3 2a, 39 pages.
The PCT Search Report and Written Opinion dated Mar. 26, 2020, for PCT Application No. PCT/US19/63935, 10 pages.

* cited by examiner

//BEARER SELECTION FOR DUAL CONNECTIVITY CELLULAR SYSTEMS

BACKGROUND

Cellular communication devices use various network radio access technologies to communicate wirelessly with geographically distributed base stations. Long-Term Evolution (LTE) is an example of a widely implemented radio access technology, which is used within $4^{th}$-Generation (4G) communication systems. New Radio (NR) is a newer radio access technology that is used in $5^{th}$-Generation (5G) communication systems. Standards for LTE and NR radio access technologies have been developed by the 3rd-Generation Partnership Project (3GPP) for use within cellular communication networks by wireless communication carriers. Note that the terms 4G and LTE are often used interchangeably when referencing certain 4G systems and components. Also, NR radio access technology may at times be referred to as 5G radio access technology.

A configuration defined by the 3GPP in the 5G NR specification, referred to as Non-Standalone Architecture (NSA), allows the simultaneous use of 4G and 5G systems for communications with a cellular device. NSA uses Dual Connectivity (DC), in which a communication device uses both an LTE radio and an NR radio for downlink receptions from and uplink transmissions to corresponding LTE and NR base stations. An LTE carrier is used for control-plane signaling and for user-plane communications. An NR carrier is used for additional user-plane bandwidth as well as for data download or transmission throughput. In a scenario such as this, the LTE carrier is said to "anchor" the communication session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are components and techniques for steering network data bearers in a cellular communication system that is configured to use $5^{th}$-Generation (5G) Non-Standalone Architecture (NSA). When using NSA, a data bearer may be steered through a $4^{th}$-Generation (4G) Long-Term Evolution (LTE) communication channel or a $5^{th}$-Generation (5G) New Radio (NR) communication channel. In some networks, it may be desirable to route bearers for certain types of services through the LTE channel and bearers for certain other types of services through the NR channel.

In described embodiments, a network data bearer is steered between LTE and NR base stations of an NSA system based on a combination of values of two or more Quality of Service (QoS) parameters. When establishing the bearer, the bearer is assigned a specific combination of a QoS Class Identifier (QCI) parameter value and an Allocation and Retention Priority (ARP) parameter value. The particular combination is selected based on a predefined scheme that maps each of multiple combinations to a corresponding service type. For example, the combination of QCI=6 and ARP=10 may be predefined as corresponding to Rich Communication Services (RCS). Similarly, the combination of QCI=6 and ARP=12 may be predefined as corresponding to Internet data services.

In operation, the LTE base station steers bearers in accordance with their QCI/ARP parameter values. Bearers with certain predefined QCI/ARP parameter value combinations are steered through the LTE base station and bearers with certain other predefined QCI/ARP parameter value combinations are steered through the NR base station. If the NR transmission queue becomes large, a bearer may be split between the LTE base station and the NR base station.

This technique provides a mechanism for the network core to specify whether any given bearer is eligible for NR communications, using existing LTE QoS parameters.

Figures 1, 2:
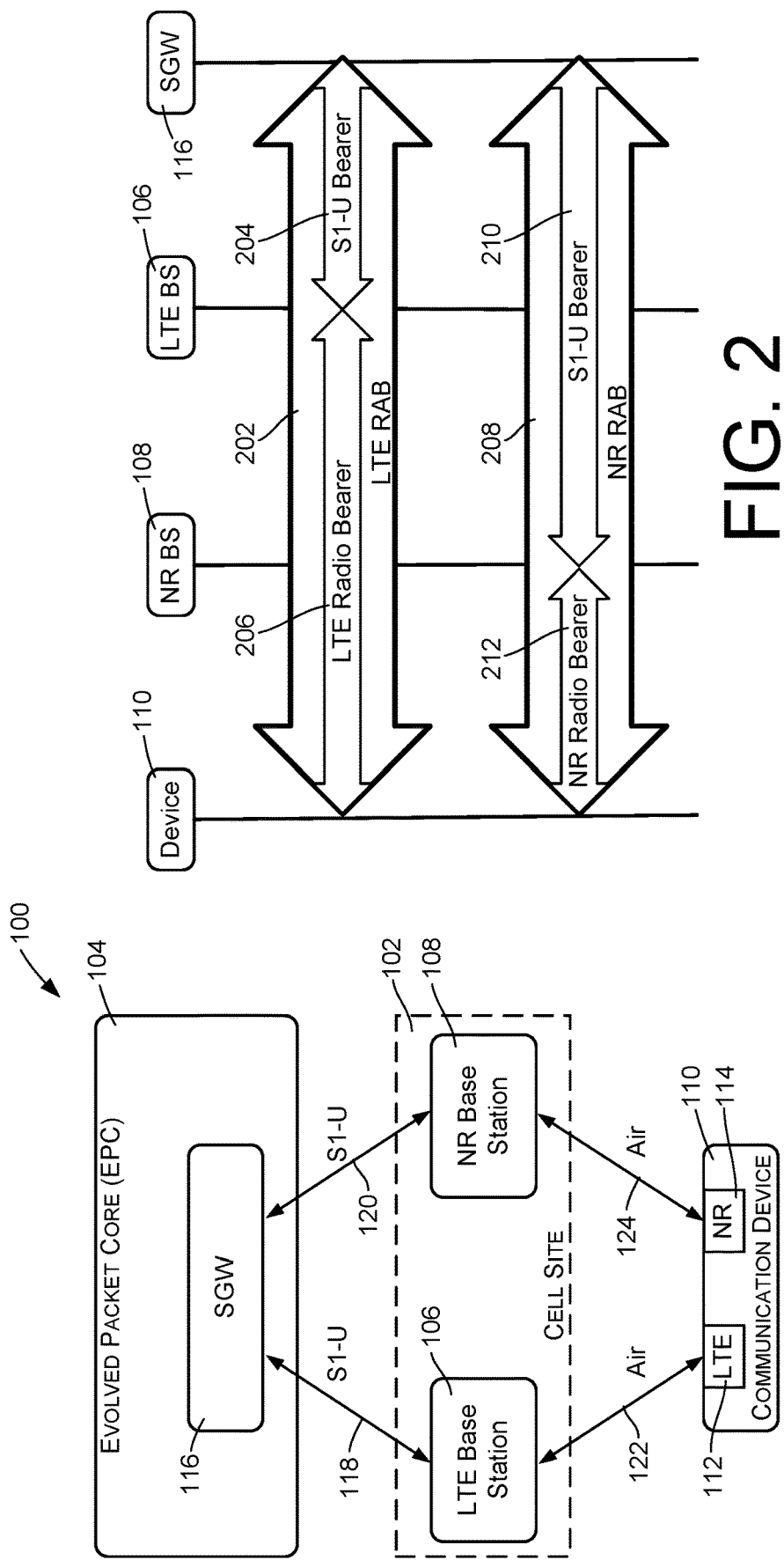
FIG. 1 is a block diagram of a cellular communication system configured to implement dual connectivity.
FIG. 2 is a diagram illustrating different types of radio access bearers (RABs) in a cellular communication system configured to implement dual connectivity.

FIG. 1 illustrates relevant high-level components of a cellular communication system 100 in which the described techniques may be implemented. The components shown in FIG. 1 may be used to implement Dual-Connectivity, for use with a Non-Standalone Architecture (NSA). When using NSA, communications between a network core and a communication device may be carried by either or both of a $4^{th}$-Generation (4G) Long-Term Evolution (LTE) communication channel and a $5^{th}$-Generation (5G) New Radio (NR) communication channel.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards.

The system 100 includes a cell site 102, which may be one of many such cell sites. The system 100 also has a network core 104, which in this example is a 4G Evolved Packet Core (EPC).

The cell site 102 has cellular base stations to support both 4G and 5G communications. In this example, the cell site 102 has an LTE base station 106 such as used in 4G cellular networks and an NR base station 108 such as used in 5G cellular networks. An LTE base station is often referred to as an eNodeB or eNB. An NR base station is often referred to as a gNodeB or gNB. An eNodeB is a base station that implements 4G LTE radio access technologies. A gNodeB is a base station that implements 5G NR radio access technologies.

The system 100 supports multiple cellular communication devices, of which a single cellular communication device 110 is shown in FIG. 1. The cellular communication device 110 is often referred to as a User Equipment (UE) or Mobile Station (MS) in communication systems such as this.

The device 110 may comprise any of various types of cellular communication devices that are capable of wireless data and/or voice communications, including smartphones and other mobile devices, "Internet-of-Things" (IoT) devices, smart home devices, computers, wearable devices, entertainment devices, industrial control equipment, etc.

The device 110 has an LTE radio 112 and an NR radio 114, as well as associated components not shown, which communicate with the LTE base station 106 and the NR base station 108, respectively. The LTE radio 112 and its associated logic implement 4G LTE communication protocols. The NR radio and its associated logic implement 5G NR communication protocols.

The network core 104 has a Serving Gateway (SGW) 116 that provides a network data interface between other elements of the network core 104 and the base stations of the cellular site 102. User plane communications between the SGW 116 and the LTE base station 106 are over a first S1 User Plane External Interface (S1-U interface) 118. User plane communications between the SGW 116 and the NR base station 108 are over a second S1-U interface 120.

Communications between the LTE base station 106 and the cellular communication device 110 are over an LTE air interface 122. Communications between the NR base station 108 and the cellular communication device 110 are over an NR air interface 124. The device 110 may select and use base stations of different cell sites 102 as the device 110 moves from location to location.

A network data bearer between the SGW 116 and the cellular communication device 110 is referred to as a Radio Access Bearer (RAB). A RAB is a sub-section of an end-to-end data bearer between a Packet Data Network (PDN) and the cellular communication device 110. When using NSA Dual Connectivity, an end-to-end bearer may be completed by an LTE RAB or an NR RAB, where an LTE RAB is a RAB established between the SGW 116 and the device 110 through the LTE base station 106, and an NR RAB is a RAB established between the SGW 116 and the device 110 through the NR base station 108. In some cases, the RAB may be implemented as a split bearer, with portions of the bearer data being routed through the LTE base station 106 and other portions of the bearer data being routed through the NR base station 108.

In a described embodiment, the LTE base station 106 communicates with the SGW 116 over a logical control interface (not shown) to steer bearer data through either the LTE base station 106 or the NR base station 108. Each bearer has associated Quality of Service (QoS) parameter values, including a QoS Class Identifier (QCI) parameter value and an Allocation and Retention Priority (ARP) parameter value. The LTE base station 106 steers the bearers in accordance with their QCI and ARP parameter values.

FIG. 2 illustrates how a RAB may be steered through either the LTE base station 106 or the NR base station 108. FIG. 2 shows an LTE RAB 202, which comprises an S1-U bearer 204 between the SGW 116 and the LTE base station (LTE BS) 106, and an LTE Radio Bearer 206 between the LTE base station (LTE BS) 106 and the device 110. FIG. 2 also shows an NR RAB 208, which comprises a second S1-U bearer 210 between the SGW 116 and the NR BS 108, and an NR Radio Bearer 212 between the NR BS 108 and the device 110. In addition to the RABs shown in FIG. 2, a bearer may at times be split between LTE and NR communication channels, with some bearer data being routed through the LTE BS 106 and other bearer data being routed through NR BS 108.

As each network data bearer is set up, it is assigned a combination of QoS parameter values. Each of multiple different combinations of QoS parameter values corresponds to a respective service type, such as RCS or Internet data services. In addition, each combination is predefined as corresponding to LTE or NR. A bearer having a combination corresponding to LTE is routed using an LTE RAB such as the LTE RAB 202 of FIG. 2. A bearer having a combination corresponding to NR is routed, if possible, using an NR RAB such as the NR RAB 208 of FIG. 2. A bearer having a combination corresponding to NR may use an LTE RAB if NR communications are not available, and may also be split between LTE and NR in some circumstances.

Figure 3:
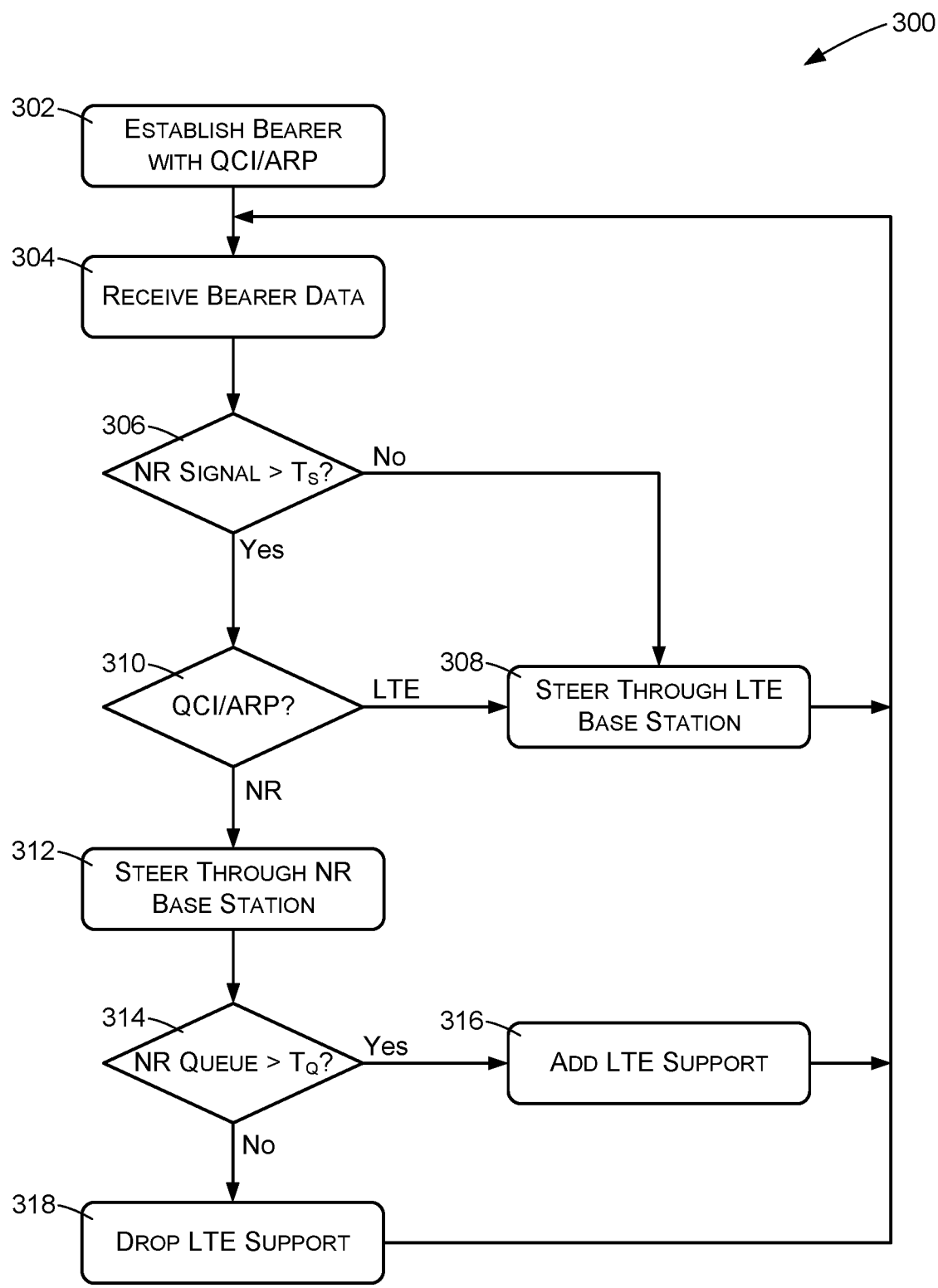
FIG. 3 is a flow diagram illustrating an example method of steering bearer data in a cellular communication system configured to implement dual connectivity.

FIG. 3 illustrates an example method 300 that may be performed by components of a cellular communication system in order to steer bearer data between an LTE base station and an NR base station when operating using Dual Connectivity, such as when operating in an NSA mode of a 4G or 5G communication network. The method 300 will be described in the context of FIG. 1, although the method may also be performed in other environments.

An action 302 comprises establishing a network data bearer having a combination of values for two or more QoS parameters, where each of multiple different combinations of QoS parameter values corresponds to a different network service. In addition, each combination is predefined as corresponding to a particular radio access technology such as LTE or NR.

In a described embodiment, the combination of QoS parameters comprises a pair of values, for a QoS Class Identifier (QCI) parameter and an Allocation and Retention Priority (ARP) parameter. As an example, one pair of QCI/ARP parameter values might be predefined to indicate a Rich Communication Service (RCS) that should use LTE bearers. Another pair of a QCI/ARP values might be predefined to indicate an Internet data service that should use NR bearers when possible.

In some cases, a pair of QoS parameter values might have the same QCI parameter values but may have different ARP parameter values. In this case, one of the ARP parameter values may be predefined to indicate a first network service and the other one of the ARP parameter values may be predefined to indicate a second network service. In addition, one of the ARP parameter values may be predefined to indicate LTE and the other one of the ARP parameter values may be predefined to indicate NR.

An action 304 comprises receiving bearer data, such as data of the bearer established in the action 302, which as mentioned has an associated combination of QoS parameter values.

An action 306 comprises determining whether NR communications are currently possible between the NR base station 108 and the cellular communication device 110. For example, the action 306 may comprise determining whether the current NR signal quality between the NR base station 108 and the device 110 is greater than a threshold Ts. If the NR signal quality is not greater than Ts, an action 308 is performed of steering the data of the network data bearer through the LTE base station 106, regardless of QoS parameter values associated with the bearer.

An action 310 is performed if the NR signal quality is greater than the threshold Ts. The action 310 comprises determining whether the combination of QoS parameter values associated with the bearer has been predefined to as corresponding LTE or NR. If the combination of QoS parameter values corresponds to LTE, the action 308 is performed of steering the bearer through the LTE base station 106.

If the combination of QoS parameter values corresponds to NR, an action 312 is performed of steering the data of the bearer through the NR base station 108.

When bearer data is steered through the NR base station 108, an action 314 is performed of determining whether an NR data queue for data of the bearer satisfies one or more criteria. For example, the action 314 may comprise determining whether the NR data queue exceeds a predefined size threshold $T_Q$. If the NR data queue is becoming too large, such as by exceeding the size threshold $T_Q$, an action 316 is performed of adding LTE support for the bearer. Adding LTE support comprises steering some of the bearer data through the LTE base station 106, while still steering other bearer data through the NR base station 108. In this situation, the bearer is referred to as a split bearer, in that it is split between LTE and NR communication channels.

If the NR data queue does not satisfy the one or more criteria, an action 318 is performed of dropping LTE support, if it had previously been added. By dropping LTE support, all of the bearer data is subsequently steered through the NR base station 108.

The method 300 is repeated continuously, beginning at the action 304, during the lifetime of the bearer. The method 300 may also be repeated for different bearers. The QoS parameter values of one bearer may call for LTE communications, while the QoS parameter values of another bearer may call for NR communications. If the QoS parameter values indicate LTE, the bearer is steered through the LTE base station 106. If the QoS parameter values indicate NR, the bearer is steered through the NR base station 108 when NR communications are available. Bearers having QoS parameter values corresponding to NR may also be split between LTE and NR base stations when queued NR data exceeds a threshold.

Figure 4:
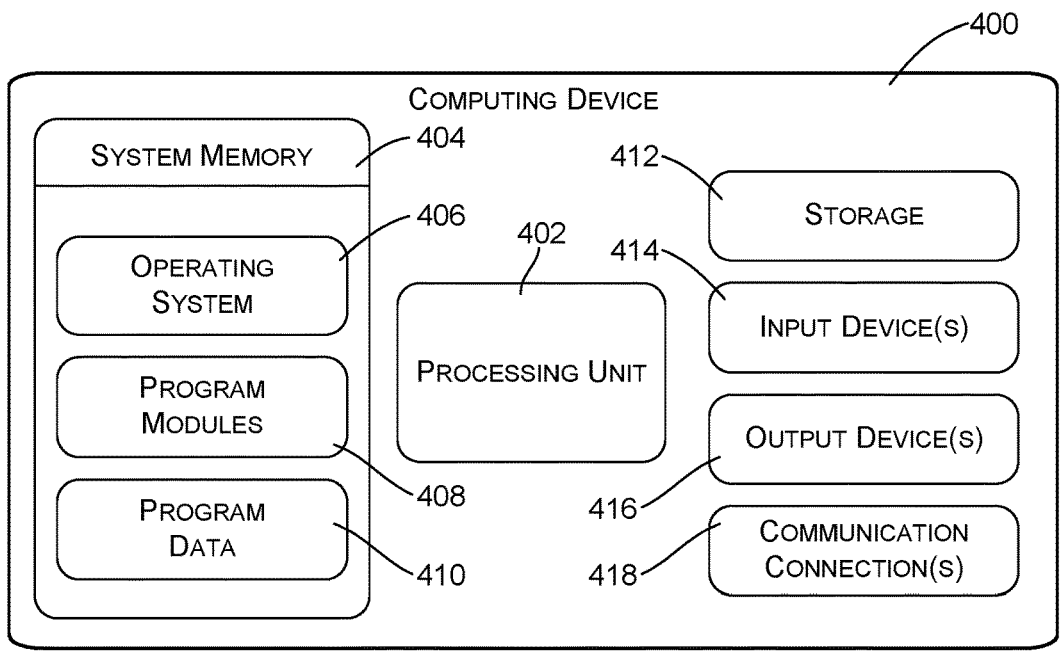
FIG. 4 is a block diagram of an example computing device that may be used to implement various functionalities described herein.

FIG. 4 is a block diagram of an illustrative computing device 400 that may be used to implement various components of a cellular communication system, such as servers, routers, gateways, administrative components, etc. One or more computing devices 400 may be used to implement each of the base stations 106 and 108, as well as various components of the network core 104 such as the SGW 116. for example.

In various embodiments, the computing device 400 may include at least one processing unit 402 and system memory 404. Depending on the exact configuration and type of computing device, the system memory 404 may be volatile (such as RAM), non-volatile (such as ROM, flash memory, etc.) or some combination of the two. The system memory 404 may include an operating system 406, one or more program modules 408, and may include program data 410.

The computing device 400 may also include additional data storage devices (removable and/or non-removable) such as, for example, magnetic disks, optical disks, or tape. Such additional storage devices are illustrated in FIG. 4 as storage 412.

Non-transitory computer storage media of the computing device 400 may include volatile and nonvolatile, removable and non-removable media implemented in any method or technology for storage of information, such as computer readable instructions, data structures, program modules, or other data. The system memory 404 and storage 412 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 400. Any such non-transitory computer-readable storage media may be part of the computing device 400.

In various embodiment, any or all of the system memory 404 and storage 412 may store programming instructions which, when executed, implement some or all of the function functionality described above as being implemented by the LTE base station 106, the NR base station 108, the SGW 116, and/or various components of the network core 104.

The computing device 400 may also have input device(s) 414 such as a keyboard, a mouse, a touch-sensitive display, voice input device, etc. Output device(s) 416 such as a display, speakers, a printer, etc. may also be included. The computing device 400 may also contain communication connections 418 that allow the device to communicate with other computing devices.

Figure 5:
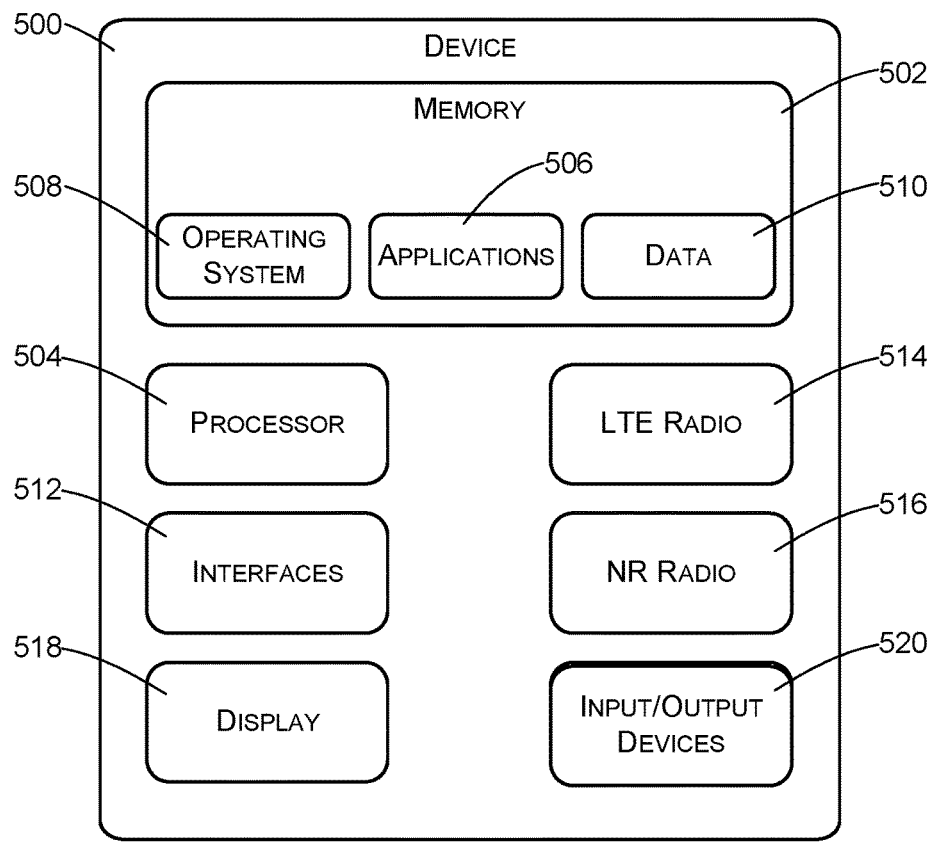
FIG. 5 is a block diagram of an example cellular communication device that may be used to implement various functionalities described herein.

FIG. 5 illustrates high-level components of an example cellular communication device 500 that may be used to implement the techniques described herein. The device 500 is an example of a cellular communication device 110 as shown in FIG. 1. FIG. 5 shows only basic, high-level components of the device 500.

The device 500 may include memory 502 and a processor 504. The memory 502 may include both volatile memory and non-volatile memory. The memory 502 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 502 may include a SIM (subscriber identity module), which is a removable smart card used to identify a user of the device 500 to a service provider network.

The memory 502 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 502 may in some cases include storage media used to transfer or distribute instructions, applications, and/or data. In some cases, the memory 502 may include data storage that is accessed remotely, such as network-attached storage that the device 500 accesses over some type of data communication network.

The memory 502 stores one or more sets of computer-executable instructions (e.g., software) such as programs that embody operating logic for implementing and/or performing desired functionality of the device 500. The instructions may also reside at least partially within the processor 504 during execution thereof by the device 500. Generally, the instructions stored in the computer-readable storage media may include various applications 506 that are executed by the processor 504, an operating system (OS) 508 that is also executed by the processor 504, and data 510.

In some embodiments, the processor(s) 504 is a central processing unit (CPU), a graphics processing unit (GPU), both CPU and GPU, or other processing unit or component known in the art. Furthermore, the processor(s) 504 may include any number of processors and/or processing cores. The processor(s) 504 is configured to retrieve and execute instructions from the memory 502.

The device 500 may have interfaces 512, which may comprise any sort of interfaces known in the art. The interfaces 512 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 500 may also have an LTE radio 514 and an NR radio 516, which may be used as described above for implementing dual connectivity in conjunction with LTE and NR base stations.

The device 500 may have a display 518, which may comprise a liquid crystal display or any other type of display commonly used in telemobile devices or other portable devices. For example, the display 518 may be a touch-sensitive display screen, which may also act as an input device or keypad, such as for providing a soft-key keyboard, navigation buttons, or the like.

The device 500 may have input and output devices 520. These devices may include any sort of output devices known in the art, such as a display (already described as display 518), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method, comprising:
    receiving, from a user equipment, a first combination of values for the two or more Quality of Service (QoS) parameters;
    establishing a first network data bearer, the first network data bearer having the first combination of values for two or more QoS parameters;
    determining that the first combination of values corresponds to a first radio access technology;
    in response to determining that the first combination of values corresponds to the first radio access technology, steering data of the first network data bearer through a first base station that uses the first radio access technology;
    receiving, from the user equipment, a second combination of values for the two or more QoS parameters;
    establishing a second network data bearer, the second network data bearer having the second combination of values for the two or more QoS parameters;
    determining that a first signal quality associated with a first base station exceeds a signal quality threshold;
    determining that the second combination of values corresponds to a second radio access technology;
    determining that a data queue for the second network data bearer satisfies one or more criteria; and
    in response to determining that the first signal quality exceeds the signal quality threshold, the second combination of values corresponds to the second radio access technology, and determining that the data queue for the second network data bearer is greater than a threshold, steering a first portion of data of the second network data bearer through a second base station that uses the second radio access technology and a second portion of the data of the second network data bearer through the first base station.

2. The method of claim 1, wherein:
    the first radio access technology is a Long-Term Evolution radio access technology; and
    the second radio access technology is a New Radio (NR) radio access technology.

3. The method of claim 1, wherein the QoS parameters comprise an Allocation and Retention Priority (ARP) parameter.

4. The method of claim 1, wherein the QoS parameters comprise:
    a QoS Class Identifier (QCI) parameter; and
    an Allocation and Retention Priority (ARP) parameter.

5. The method of claim 1, wherein steering the data of the first network data bearer through the first base station and steering the data of the second network data bearer through the second base station are performed by the first base station.

6. The method of claim 1, wherein the first and second base stations are configured in a 5th-Generation (5G) Non-Standalone Architecture (NSA).

7. A Long-Term Evolution (LTE) base station, comprising:
    one or more processors;
    one or more non-transitory computer-readable media storing computer-executable instructions that, when executed by the one or more processors, cause the LTE base station to perform actions comprising:
    receiving data of a first network data bearer from a user equipment, the first network data bearer having a first pair of values for a Quality of Service Class Identifier (QCI) parameter and an Allocation and Retention Priority (ARP) parameter, respectively;
    determining that the first pair of values corresponds to LTE radio access technology;
    in response to determining that the first pair of values corresponds to LTE radio access technology, steering the data of the first network data bearer through a LTE base station;
    receiving data of a second network data bearer from the user equipment, the second network data bearer having a second pair of values for the QCI and ARP parameters, respectively;
    determining that the second pair of values corresponds to New Radio (NR) radio access technology;
    determining that a NR signal quality between the second data bearer and the user equipment is greater than a signal quality threshold;

determining that a NR queue associated with the second network data bearer is greater than a size threshold; and in response to determining that the second pair of values corresponds to NR radio access technology, the NR signal quality is greater than the signal quality threshold, and the NR queue is greater than the size threshold, steering a first portion of the data of the second network data bearer through an NR base station and a second portion of the data of the second network data bearer through the LTE base station.

8. The LTE base station of claim 7, wherein each of multiple pairs of values is associated with a respective network service.

9. The LTE base station of claim 7, wherein the LTE base station and the NR base station are configured in a 5th Generation (5G) Non-Standalone Architecture (NSA).

10. The LTE base station of claim 7, the actions further comprising:

receiving second data of the second network data bearer from the user equipment;

determining that the NR signal quality between the NR second data bearer and the user equipment is less than the threshold; and in response to determining that the second pair of values corresponds to NR radio access technology and the NR signal quality is less than the threshold, steering the second data of the second network data bearer through the LTE base station.

11. The LTE base station of claim 7, the actions further comprising:

in response to determining that the data queue associated with the NR queue is less than the size threshold and the NR signal quality is less than the signal quality threshold, steering the first portion and the second portion of the data through the NR base station.

12. A system, comprising:

one or more processors;

one or more non-transitory computer-readable media storing computer-executable instructions that, when executed by the one or more processors, cause the one or more processors to perform actions comprising:

receiving, from a user equipment, a first combination of values for the two or more QoS parameters;

determining that a first network data bearer has the first combination of values for two or more Quality of Service (QoS) parameters;

in response to determining that the first network data bearer has the first combination of values, steering first data of the first network data bearer through a first base station that implements a first radio access technology;

determining that a data queue associated with the first radio access technology exceeds a size threshold;

in response to determining the data queue exceeds the size threshold, implementing a second radio access technology associated with the first network data bearer;

determining that a first signal quality associated with the first radio technology is less than a signal quality threshold;

receiving, from the user equipment, a second combination of values for the two or more QoS parameters;

establishing a second network data bearer, the second network data bearer having the second combination of values for the two or more QoS parameters; and in response to determining that the first signal quality for the first network data bearer is less than the signal quality threshold, steering second data of the first network data bearer through the second network data bearer that implements the second radio access technology.

13. The system of claim 12, wherein:

the first radio access technology comprises a New Radio (NR) radio access technology;

the second radio access technology comprises a Long-Term Evolution (LTE) radio access network.

14. The system of claim 12, wherein the QoS parameters comprise an Allocation and Retention Priority (ARP) parameter.

15. The system of claim 12, wherein the QoS parameters comprise:

a QoS Class Identifier (QCI) parameter; and an Allocation and Retention Priority (ARP) parameter.

16. The system of claim 12, wherein steering the first data through the first base station and steering the second data through the second base station is performed by the first base station.

17. The system of claim 12, wherein each of multiple combinations of values for the two or more QoS parameters is associated with a network service.

18. The system of claim 12, wherein the first and second base stations implement a 5th-Generation (5G) Non-Standalone Architecture (NSA).

19. The system of claim 12, wherein the actions further comprise:

determining that the second network data bearer has the second combination of QoS parameters for the two or more Quality of Service (QoS) parameters.

20. The system of claim 12, wherein the actions further comprise:

determining that the data queue associated with the first radio access technology is less than the size threshold; and in response to determining the data queue is less than the size threshold, dropping support for the second radio access technology with the first network data bearer.

* * * * *